(12) United States Patent
Mahato et al.

(10) Patent No.: US 12,705,049 B2
(45) Date of Patent: Aug. 11, 2026

(54) OPTIMIZING TELEMETRY VOLUME

(71) Applicant: Microsoft Technology Licensing, LLC, Redmond, WA (US)

(72) Inventors: Ajanta Mahato, Snoqualmie, WA (US); Benjamin Eric Ahlvin, Seattle, WA (US); Michael Christopher Cales, Gilbert, AZ (US); Garima Gupta, Bellevue, WA (US); Dolly Sobhani, Kirkland, WA (US); Matthew Joseph Koscumb, Poulsbo, WA (US); Rohit Raj, Redmond, WA (US); Pallav Punhani, Vancouver (CA); Brian Kihneman, Bellevue, WA (US); Siddharth Dahiya, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 18/495,828

(22) Filed: Oct. 27, 2023

(65) Prior Publication Data

US 2025/0138821 A1 May 1, 2025

(51) Int. Cl.
*G06F 21/57* (2013.01)
*G06F 8/77* (2018.01)
(Continued)

(52) U.S. Cl.
CPC .............. *G06F 8/77* (2013.01); *H04L 67/535* (2022.05); *G06F 8/71* (2013.01); *G06F 9/30185* (2013.01); *G06F 9/451* (2018.02); *G06F 9/4875* (2013.01); *G06F 9/4881* (2013.01); *G06F 9/542* (2013.01); *G06F 9/547* (2013.01); *G06F 11/3409* (2013.01); *G06F 11/3438* (2013.01);
(Continued)

(58) Field of Classification Search
CPC ... G06F 8/77; G06F 8/71; G06F 9/451; G06F 9/30185; G06F 9/547; G06F 9/4875; G06F 9/542; G06F 9/4881; G06F 11/3409; G06F 11/3438; G06F 11/3466; G06F 11/3495; G06F 11/366; G06F 11/3612; G06F 21/577; H04L 67/535
See application file for complete search history.

(56) References Cited

U.S. PATENT DOCUMENTS 11,144,376 B2 * 10/2021 Piaseczny ........... G06F 11/3495
11,151,015 B2 * 10/2021 Markiewicz ........... G06N 20/00
(Continued)

*Primary Examiner* — Anibal Riveracruz
(74) *Attorney, Agent, or Firm* — Novo TechIP International PLLC

(57) ABSTRACT

A system for optimizing telemetry volume generated for an application product includes: a volume calculation service and a configuration service coupled to a client device via a network connection. The volume calculation service receiving identification of a particular event that occurs during execution of the application product by the client and calculating an optimized sampling rate for that event in telemetry produced by the client, the optimized sampling rate calculated based on reducing an overall volume of telemetry while still maintaining tracking of the particular event within the telemetry. The configuration service generating a configuration for the client device, the configuration service configuring the client to use the optimized sampling rate to produce telemetry for the event during execution of the application product by the client device.

16 Claims, 10 Drawing Sheets

320

Generate a configuration for a client running the application product, the configuration indicating a sampling rate for an event arising during execution of the application product by the client, the configuration and sampling rate indicating for the client when to selectively generate telemetry for the event
321

Configure the client with the configuration to optimize telemetry for the event that is produced by the client to reduce a load on resources used to produce, store and analyze the telemetry
322

(51) Int. Cl.

| | |
|---|---|
| ***G06F 9/38*** | (2018.01) |
| ***G06F 11/07*** | (2006.01) |
| ***G06F 11/30*** | (2006.01) |
| ***G06F 11/34*** | (2006.01) |
| ***G06F 11/36*** | (2025.01) |
| ***H04L 67/50*** | (2022.01) |
| *G06F 8/71* | (2018.01) |
| *G06F 9/30* | (2018.01) |
| *G06F 9/451* | (2018.01) |
| *G06F 9/48* | (2006.01) |
| *G06F 9/54* | (2006.01) |
| *G06F 11/3604* | (2025.01) |
| *G06F 11/362* | (2025.01) |

(52) U.S. Cl.
CPC ...... *G06F 11/3466* (2013.01); *G06F 11/3495* (2013.01); *G06F 11/3612* (2013.01); *G06F 11/366* (2013.01); *G06F 21/577* (2013.01)

(56) References Cited

U.S. PATENT DOCUMENTS

| | | | | |
|---|---|---|---|---|
| 2016/0359713 | A1* | 12/2016 | Shi | H04L 43/04 |
| 2018/0232431 | A1* | 8/2018 | Natarajan | G06F 21/604 |
| 2018/0373617 | A1* | 12/2018 | Gaier | G06F 11/3055 |
| 2021/0191726 | A1* | 6/2021 | Tarango | G06F 11/3006 |
| 2022/0019511 | A1* | 1/2022 | Marcin | G06F 11/3644 |
| 2022/0229766 | A1* | 7/2022 | Jain | G06F 11/3409 |
| 2024/0004956 | A1* | 1/2024 | Ertl | G06F 11/3466 |
| 2024/0112069 | A1* | 4/2024 | Vichare | G06F 8/00 |
| 2024/0241965 | A1* | 7/2024 | Andrews | G06F 21/577 |

* cited by examiner

A.

Usage Scorecard

| | Observed Rate | Margin of Error | Sampling Rate | Post-Sampling Event Volume |
|---|---|---|---|---|
| Edit rate after using feature A: | 24.39174% | ± 0.00004% | 2% | 432,983,402 |
| Edit rate after using feature B: | 24.5% | ± 0.4% | 2% | 39,302 |

OK

B.

Usage Scorecard

| | Observed Rate | Margin of Error | Sampling Rate | Post-Sampling Event Volume |
|---|---|---|---|---|
| Edit rate after using feature A: | 24.39% | ± 0.02% | 0.1% | 21,649,170 |
| Edit rate after using feature B: | 24.54% | ± 0.06% | 100% | 1,965,100 |

Telemetry Analysis System 116
Telemetry Store 110
Application product 119
Population of Clients 118
UI Service 114
Telemetry Volume Service 112
Volume Calculation Service 104
Configuration Service 106
402
Network 101
Processor and memory 403
User Interface 102
401

Generate a configuration for a client running the application product, the configuration indicating a sampling rate for an event arising during execution of the application product by the client, the configuration and sampling rate indicating for the client when to selectively generate telemetry for the event
321

Configure the client with the configuration to optimize telemetry for the event that is produced by the client to reduce a load on resources used to produce, store and analyze the telemetry
322

FIG. 5

OPTIMIZING TELEMETRY VOLUME

BACKGROUND

In the field of software engineering, generating telemetry refers to the process of collecting and transmitting data from software applications and systems to a centralized location for monitoring, analysis, and decision-making. Telemetry provides real-time information about the performance, behavior, and usage of software, allowing developers and administrators to gain insights into how the software is functioning and how users are interacting with it. This data can be instrumental in identifying issues, optimizing performance, and making informed decisions to improve the overall quality and reliability of the software. Telemetry data often includes metrics such as error rates, response times, resource utilization, and user engagement statistics.

Consequently, product telemetry is a critical signal for product designers who want to understand feature usage and adoption as well as product health and performance. Standard practices have been established around properly instrumenting, collecting, and analyzing product telemetry and are hugely beneficial for optimizing the software products.

However, significant challenges still emerge for products that are used on a global scale, particularly around the costs associated with collecting and processing large volumes of telemetry data. A typical solution to this volume issue is to introduce sampling, a technique where only a certain percentage of sessions (or devices, or users, etc.) actually sends product telemetry for analysis. While this broad-based sampling approach can reduce telemetry volume to a reasonable level, it typically does so at the cost of visibility into low-volume events such as those generated by lightly used features or small segments of the overall population.

Thus, a technical problem remains of how to collect the needed telemetry for analysis of a product that produces a large volume of telemetry without inadequate sampling that sacrifices tracking of lower volume events.

SUMMARY

In one general aspect, the following describes a system for optimizing telemetry volume generated for an application product. The system includes a volume calculation service and a configuration service coupled to a client device via a network connection. The volume calculation service receiving identification of a particular event that occurs during execution of the application product by the client and calculating an optimized sampling rate for that event in telemetry produced by the client, the optimized sampling rate calculated based on reducing an overall volume of telemetry while still maintaining tracking of the particular event within the telemetry. The configuration service generating a configuration for the client device, the configuration service configuring the client to use the optimized sampling rate to produce telemetry for the event during execution of the application product by the client device. The configuration service configuring the client with the configuration to reduce an overall volume of telemetry that is produced by the client to reduce a load on resources used to produce, store and analyze the telemetry while still maintaining tracking of the particular event within the telemetry.

In another general aspect, the following describes a method of optimizing telemetry volume for an application product, the method includes: generating a configuration for a client running the application product, the configuration indicating a sampling rate for an event arising during execution of the application product by the client, the configuration and sampling rate indicating for the client when to selectively generate telemetry specifically for the event; and configuring the client with the configuration, the configuration reducing an overall amount of telemetry produced by the client while optimizing an amount of telemetry for the event that is produced by the client so as to reduce a load on resources used to produce, store and analyze the telemetry while still maintaining tracking of the event in the telemetry.

In another general aspect, the following describes a device that includes: a processor, and a memory storing executable instructions which, when executed by the processor, cause the processor, alone or in combination with other processors, to perform the following functions: determine a sampling rate that maps to an event frequency for an event; and provide a telemetry configuration based on the sampling rate to client devices to limit a volume of reported telemetry data while maintaining reporting of the event within a determined margin of error.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2B depicts an example user experience based on the optimized telemetry according to the present description.

FIG. 5 depicts a flowchart for a method of collecting telemetry according to aspects of the present description.

DETAILED DESCRIPTION

Figure 1:
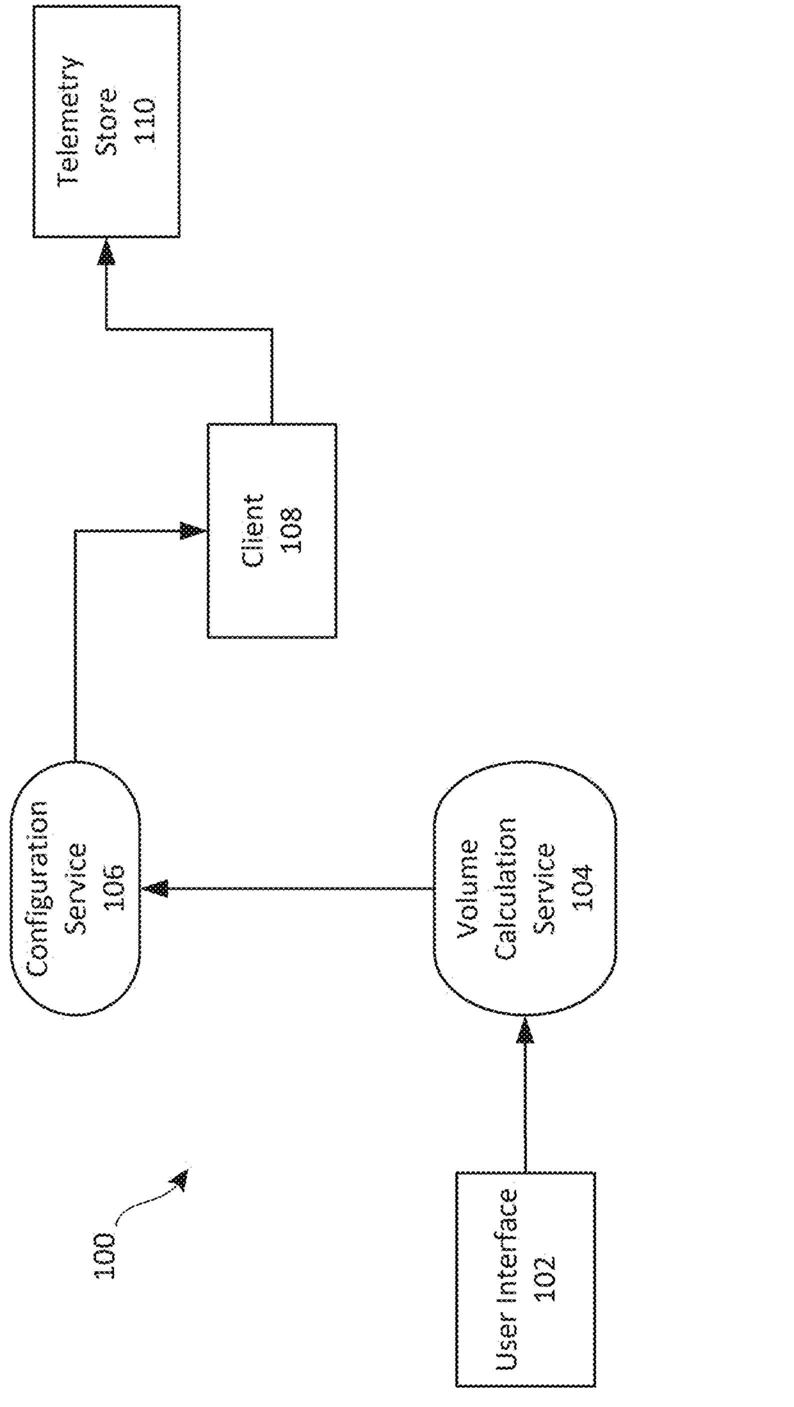
FIG. 1 depicts an example data flow between some elements of a system in which aspects of this description for generating telemetry are implemented.

As noted above, a large software product, including products used on a global scale, can produce a volume of telemetry data that becomes too large for reasonable analysis. Sampling only a fraction of this telemetry data can reduce the volume to a manageable level. However, it does so at the cost of possibly losing the ability to monitor low-volume events such as those generated by lightly used features or a small segment of the overall user or tenant population. Thus, a technical problem remains of how to collect the needed telemetry for analysis of a product that produces a large volume of telemetry without inadequate sampling that sacrifices tracking of lower volume events.

It should also be recognized that there is a cost in financial terms, in time and in use of computing processing resources associated with generating, collecting and processing a volume of telemetry. Thus, there are significant advantages in limiting the amount of telemetry generated while maintaining adequate insight into the behavior of the product under real usage.

To address these technical problems, the following describes an adaptive, stratified sampling system that can achieve even greater volume reduction than flat-rate sampling while maintaining a desired level of precision for low-volume events. This technical solution to the identified technical problem can also efficiently ensure that data is collected based on need and usage.

To make the sampling system appropriately adaptive, different events are sampled at different rates. This allows high-volume events to be sampled at a lower rate that still provides sufficient telemetry data for analysis, while low-volume events are sampled at a higher rate so as to still obtain sufficient telemetry data for analysis even though the event is low-volume. This effectively solves the problem of low-volume events by allowing them to be sampled at different rates, each in accordance with their volume and the level of precision needed in the metrics for which they account.

The sampling is also stratified in that sampling can be directed independently for different segments. For example, sampling can be specified independently by application, audience, user group, channel, platform, build or other subset of the application product or userbase. Thus, the approach described here may be referred to as adaptive stratified sampling to generate telemetry optimally.

To determine the appropriate sampling rate for an event, the system uses the following technique. Product developers typically consume product telemetry by examining metrics calculated based on the underlying event counts. When sampling is introduced, some uncertainty is introduced into these metrics because not all of the telemetry is being reviewed. The amount of uncertainty is related to the size of the observed, i.e., the sampled, population and metric calculation details. For example, the margin of error for a proportion metric can be calculated as:

$$MoE = \pm z\sqrt{\frac{p(1-p)}{SS}}$$

where z represents the critical value for the confidence interval, p represents the true proportion and SS represents the size of the sampled population. If the product developer has an idea of what is an acceptable margin of error and confidence level, this equation can be solved for SS. This, then, represents an optimized post-sampling event volume.

The total or actual event volume can be divided by SS to determine the optimized sampling rate for that event. Again, this effectively solves the problem of low-volume events because they can be sampled at different rates, each in accordance with their volume and the level of precision needed in the metrics that they power.

This adaptive sampling technique, described above, can be extended to also solve the additional technical problem of low data volumes in small segments of the overall population. Once such a small segment of the population is identified, the metrics generated by that can be characterized as comprising different dimensions. Each dimension is a variable that has a number of possible values. A Volume Calculation Service will then apply the adaptive sampling logic, described above, to each element of a dimension independently to determine its optimized sampling rate for that dimension.

For example, consider the scenario where there are two distinct dimensions of the userbase for which product developers want to account. In this example, a Volume Calculation Service will apply the adaptive sampling logic, described above, to each element of a dimension independently to determine an optimized sampling rate for that dimension. For example, the dimensions could be language (with options [L1, L2, L3]) and renewal-term (with options [monthly, annual]) and the adaptive sampling technique, described above, yields the following optimized sampling rates:

L1: 20%; L2: 25%; L3: 100%

Monthly: 50%; Annual: 25%

The sampling rate that will be applied to a given session (or device, or user) is the maximum of the sampling rates for the segments to which that user belongs. For the example above, all users using language L1 on annual subscriptions would be sampled at 20%; whereas users using language L1 on monthly subscriptions would be sampled at 50%. This guarantees that each segment of the population can be analyzed with the desired level of precision while generating a minimal telemetry data volume.

One of the challenges introduced by sampling is that some additional steps must occur when calculating metrics. This is especially true for the stratified adaptive sampling technique being described here, where data collected from users may have been collected at different sampling rates. The one solution for solving this problem is to apply the most extreme sampling rate encountered in a dataset to all other elements in that dataset. This can be done if each element in the dataset contains information about the sampling rate that was applied when it was generated, and its number line position. The system will guarantee that this is the case. More sophisticated possible techniques, such as appropriately weighting the differently sampled subpopulations, can also be employed.

FIG. 1 depicts an example data flow between some elements of a system 100 in which aspects of this description are implemented. In system 100, the client 108 represents one of any number of client or tenant devices that are running the product application for which telemetry is to be generated. The client 108 will monitor the operation of the product application to produce telemetry data. As noted above, telemetry provides real-time information about the performance, behavior, and usage of software, allowing developers and administrators to gain insights into how the software is functioning and how users are interacting with it.

The client 108 population sends generated telemetry data to a telemetry store 110. The telemetry data in the store 110 can then be analyzed to guide further development of the product application. Consumption scenarios of the telemetry data include any relational database or big data tooling.

A user interface 102 allows for the input of various configuration options such as Event Name, Margin of Error, Expected Event Frequency, and the attributes of the client configuration (App, Audience, Builds, Release channels) that these settings target via the configuration service 106. The user interface service 102 also gives the user flexibility to override any setting auto-calculated by the system. This will be an important interface when the user is looking for higher volume (less sampled or unsampled), for scenarios like debugging an issue or reporting some intermittent SLT (Senior Leadership Team) signals.

The volume calculation service 104, based on user-defined inputs, calculates the parameters for optimal telemetry generation using the calculation described above. Additionally, the volume calculation service 104 maps the event frequency and margin of error to events that will produce telemetry. The volume calculation service 104 is also responsible for generating an EventFrequency-MarginOfError to sampling rate mapping for each application, audience groups and other pivots supported by the system. This mapping is based on the session volume observed for the pivots. This is an important functionality as the system can alter the mapping table with changes in the session volume due to factors like seasonality, new user growth, etc. This sampling rate mapping is then set in the configuration service 106.

The configuration service 106 is responsible for managing configuration of the stratified, adaptive sampling and dynamically delivering configurations to the clients 108 that control how and when the clients generate and send telemetry to the store 110. The configuration service 106 delivers the right configuration meant for the client based on the pivots that that client supports like a specific application, audience ring, license, etc. The configuration service 106 also allows enabling/disabling/altering of configurations without a redeployment of clients to provide an in-real-time management experience.

The clients 108 fetch the configurations from configuration service 106 that contains the values of event frequency and margin of error for an event. The client 108 also fetches the EventFrequency-MarginOfError-SamplingRate mapping from the configuration service 106. For each event, the client 108 will determine the sampling rate that maps to the event's event frequency and margin of error from the mapping table, described above. Using this determined sampling rate, the client 108 uploads or does not upload telemetry for an event. Consequently, the generation of telemetry is optimized in terms of telemetry volume without sacrificing visibility into lower-frequency events.

More specifically, the volume calculation service 104 determines, event frequency and margin of error for an event based on the telemetry from data store or user input). In an example, assume EventFrequency (EF): 2-3 and user mentions the MarginOfError (MOE): 0.2%. Also based on the session volume collected for an application, audience (and other pivots like locale or as needed), the volume calculation service 104 creates a map (possible EF*possible MOE size) for each combination of pivots. An example of such a mapping is as follows:

| EF | MOE | SampleRate |
|---|---|---|
| 0-2 | 0.1 | 50% |
| 2-3 | 0.1 | 25% |
| 2-3 | 0.2 | 10% |
| . . . | . . . | . . . |

As the application or feature usage grows, the corresponding sessions increase, and the volume calculation service 104 updates the map. The event configuration need not be updated because the event frequency, being a frequency in a session, typically remains the same. However, in rare scenarios where the feature usage in a session increases, the volume calculation service 104 will then update the event frequency configuration for the event. The resulting updated map is then delivered to all clients, and the event is then sampled at new rates based on the updated map.

The advantages of having event frequency tracked are as follows. Increases or changes in application usage will lead to changes to the mapping table instead of changing sample rates for individual events. When new pivot of population is added, each event configuration need not be calculated/updated (which could be in the thousands). All that is needed is just the new mapping table targeting those impacted. The new table can be distributed to those clients, and each client will auto-adjust the sample rates from the new mapping tables.

Figure 2A:
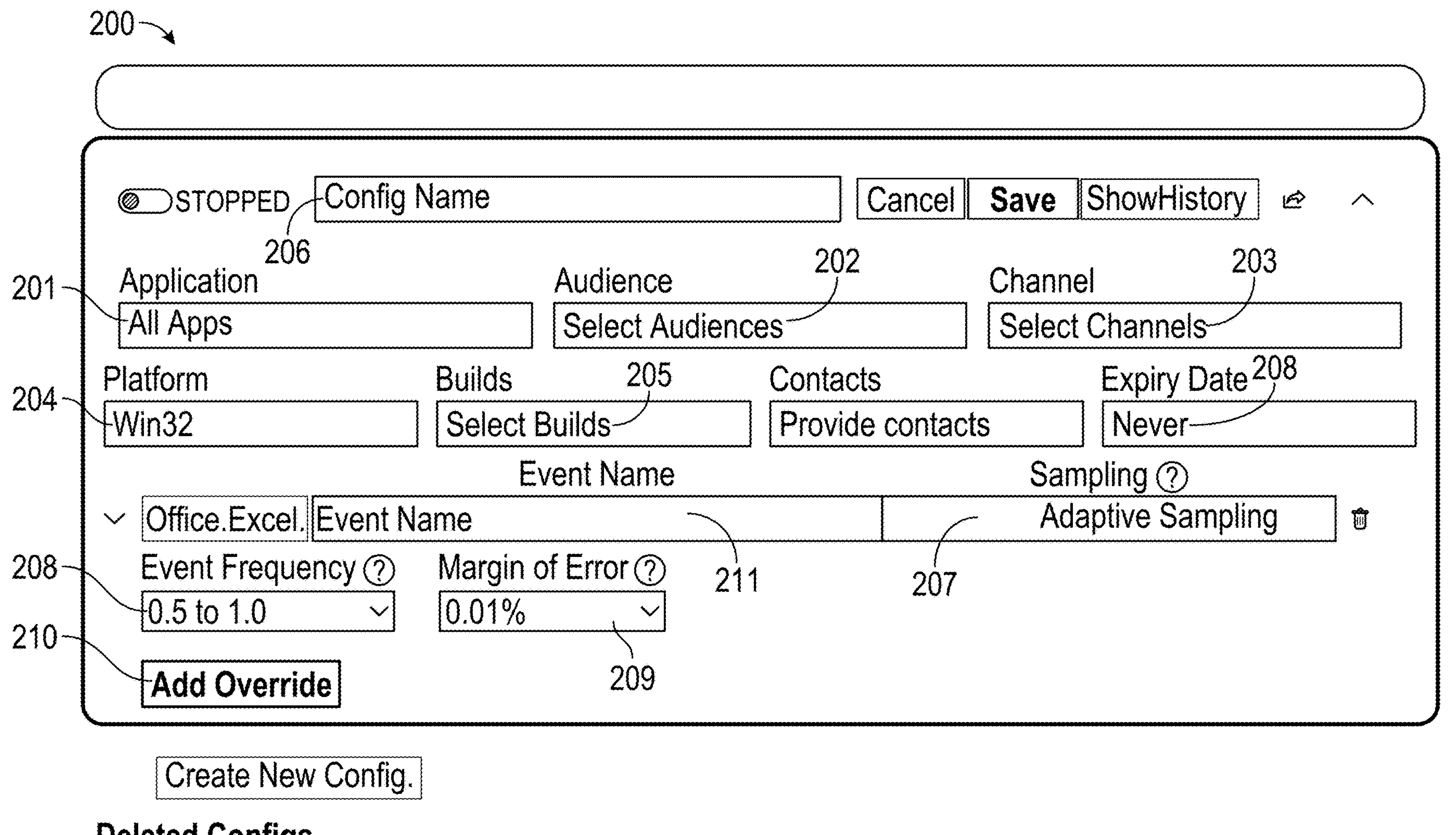
FIG. 2A depicts an example user interface for a system according to the present description.

FIG. 2A depicts an example user interface 200 for a system according to the present description. This user interface may be used as the user interface 102 shown in FIG. 1. The user interface 200 allows the user to enter a configuration name 206 for different configurations. The user can then operate different configurations as circumstances change.

The user interface 200 also allows the user to specify the strata for an adaptive sampling using any combination of application 201, audience 202, channel 203, platform 204, or build 205. The user can also set an expiry date 208 for the adaptive sampling. Field 207 indicates that the sampling is adaptive, as described herein.

The user interface 200 may also show an Event Frequency 208 and Margin of Error 209 calculated by the system. The user is given a control 210 to override these values as desired. The EventName field 211 is the unique identifiable name of the event whose settings are being displayed in the UI. The AddOverride button 210 gives the user ability to add more event overrides similar to the example.

FIG. 2B depicts an example user experience based on the optimized telemetry of the present description. This is a simplified version of experimentation scorecards as output by a system, such as system 116 of FIG. 4, that consumes the telemetry and reports out to end-users. The top image (A) represents a flat-sampling approach and shows that the system is overly precise on some metric and not able to achieve sufficient precision on others. The bottom image (B) shows how, with adaptive sampling, the system is able to tune the telemetry volumes on an event-by-event basis, achieving reasonable precision on all metrics and dropping overall telemetry volume by 95%.

Figure 3:
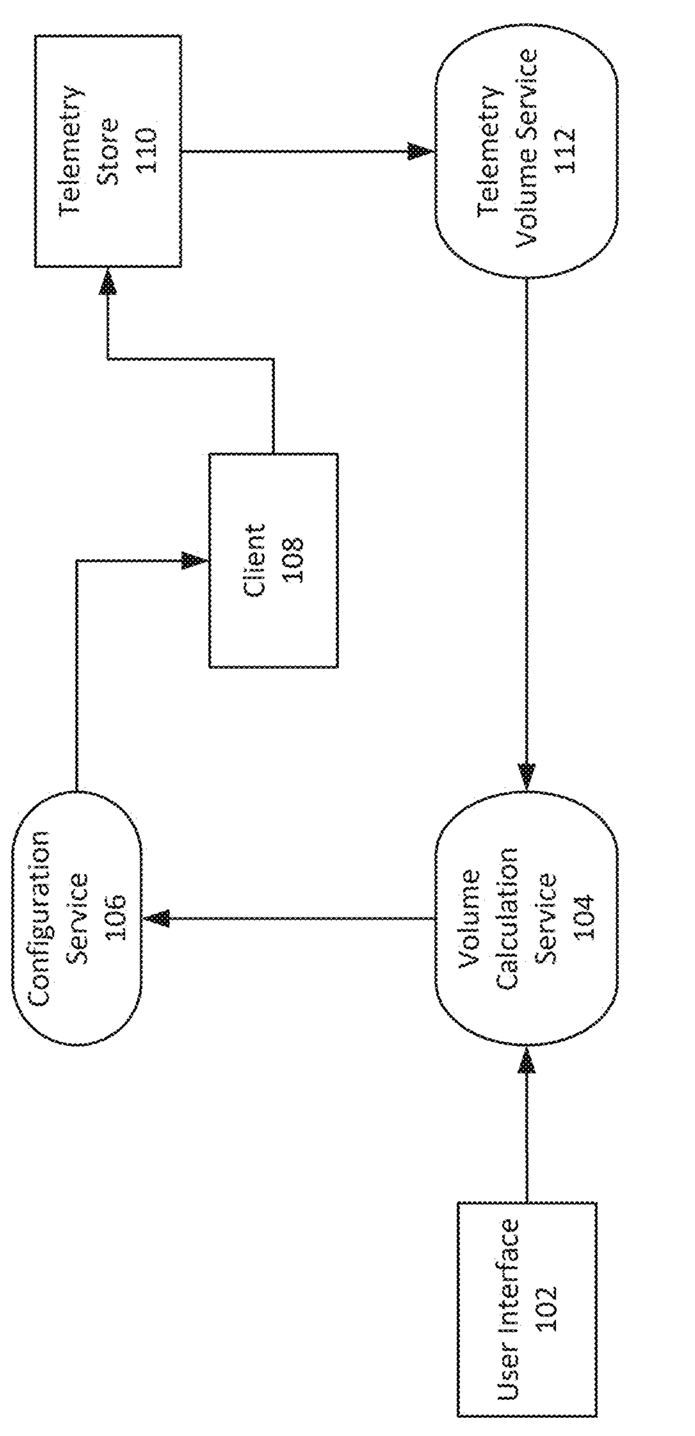
FIG. 3 depicts another example data flow with additional details according to aspects of this description.

FIG. 3 depicts another example data flow with additional details according to aspects of this description. The system in FIG. 3 is the same as in FIG. 1 with the addition of a feedback loop that includes a telemetry volume service 112.

The telemetry volume service 112 is responsible for calculating the volume for (1) each event and (2) total sessions for the sampling rate map from data store 110. The telemetry volume service 112 also, then, acts as input to the volume calculation service 104. Using the information from the telemetry volume service 112, the volume calculation service 104 can determine, on an ongoing basis, whether the volume of telemetry resulting from the current configuration is optimal. If not, the volume calculation service can make adjustments that are sent to the configuration service 106 and then reflected in the configuration made available to the client 108.

Figure 4:
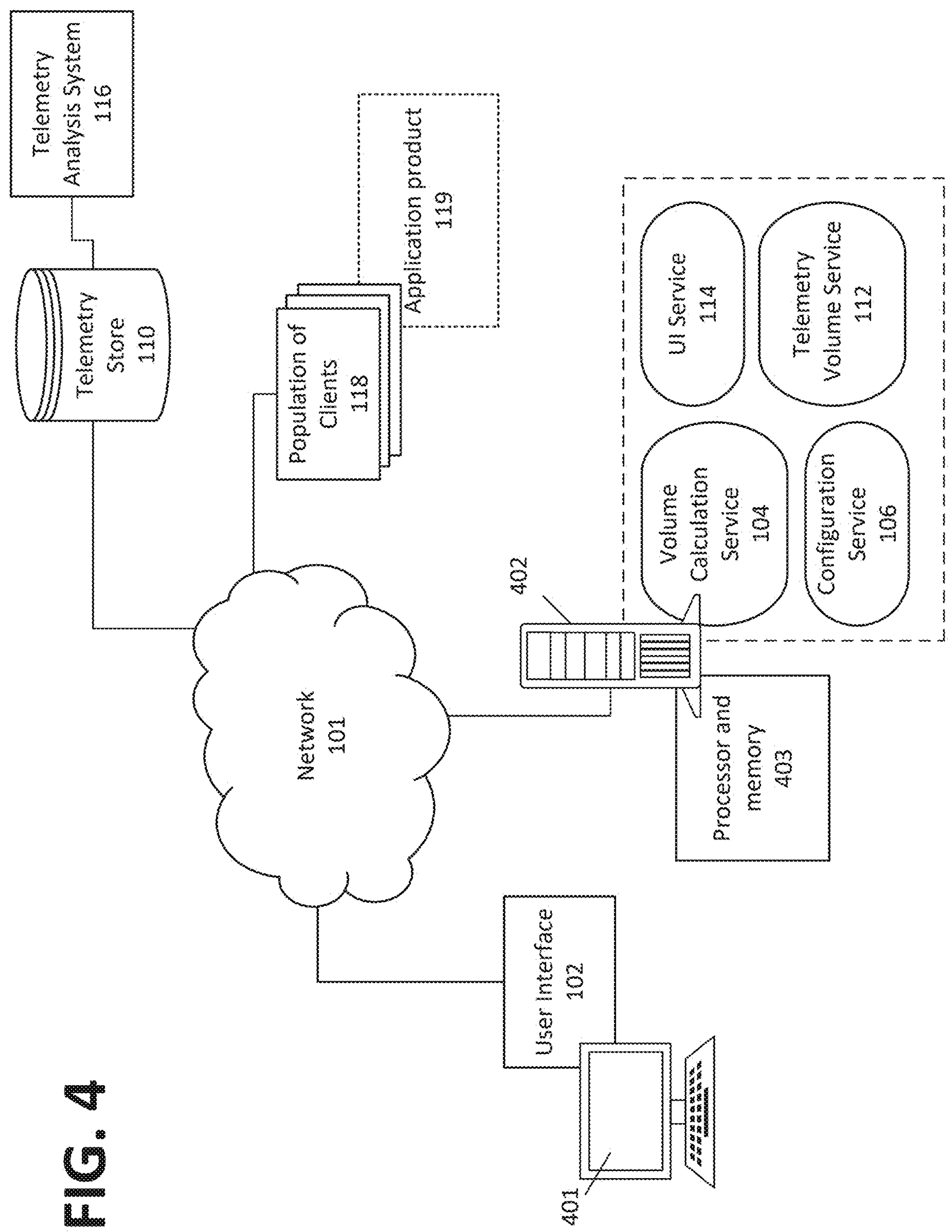
FIG. 4 depicts an example system according to aspects of this description.

FIG. 4 depicts another example system with additional details according to aspects of this description. As shown in FIG. 4, the user interface 102 may be operated at a terminal 401. From this terminal 401, the user can provide the input described above for guiding the adaptive, stratified telemetry generation.

A network 101 connects the terminal 401 with a server 402. The server 402, or any number of servers or virtual machines, can support the various services described herein, including the volume calculation service 104, the configuration service 106 and the telemetry volume service 112. For example, the server 402 includes a processor and memory 403 for implementing the services described. The server 402 may also support a user interface service 114 that provides the user interface 102 at the terminal 401 via the network 101.

The population of clients 118 are all executing a common application product 119 for which developers desire the telemetry. The clients are also connected to the network 101 and receive the configuration for adaptive stratified sampling from the configuration service 106 via the network 101. As events occur in the execution of the application product 119, as specified in the configuration from the configuration service 106, the clients 118 selectively generate telemetry on the operation of the application product 119. The telemetry store 110 is also connected to the network 101 for receiving the telemetry generated by the population of clients 118.

Lastly, a telemetry analysis system 116 is provided in communication with the telemetry store 110. This system 116 utilizes the telemetry to determine insights that guide developers in further developing the application product 119.

FIG. 5 depicts a flowchart for a method of collecting telemetry according to aspects of the present description. As shown in FIG. 5, this example method is for optimizing telemetry volume for an application product. The method 320 includes: generating a configuration for a client running the application product, the configuration indicating a sampling rate for an event arising during execution of the application product by the client, the configuration and sampling rate indicating for the client when to selectively generate telemetry for the event 321. The method then includes configuring the client with the configuration to optimize telemetry for the event that is produced by the client to reduce a load on resources used to produce, store and analyze the telemetry 322.

Figure 6A:
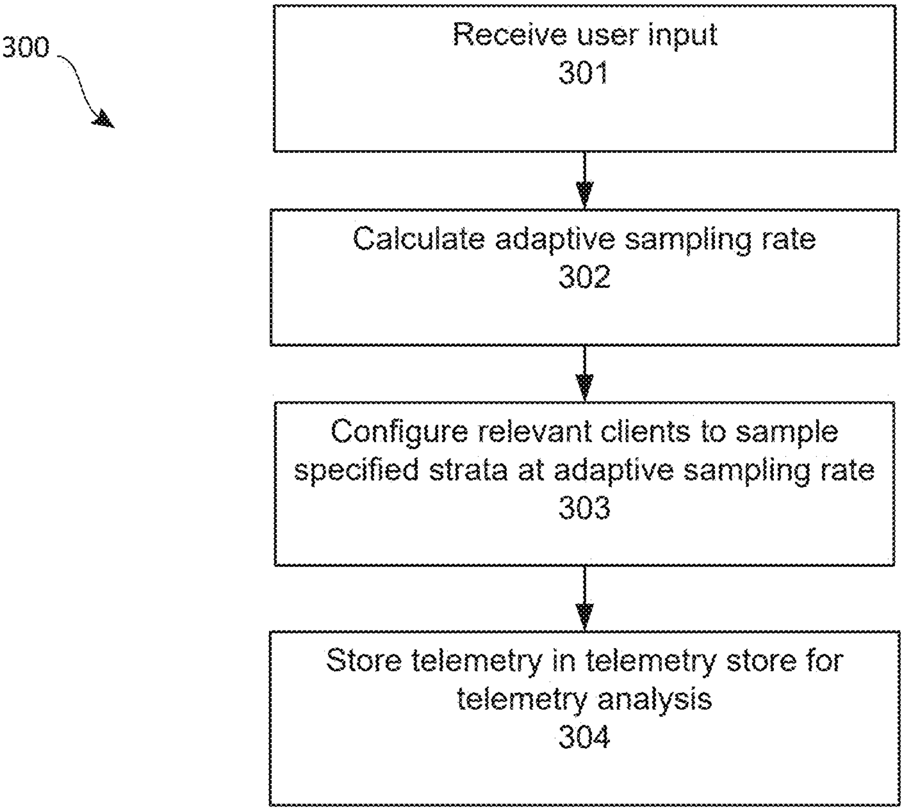
FIGS. 6A and 6B depict other flowcharts for a method with additional details for collecting telemetry according to aspects of the present description.

FIG. 6A depicts another example flowchart for a method of collecting telemetry according to aspects of the present description. As shown in FIG. 6A, the method 300 begins with receiving user input 301. As described above in connection with the user interface, this user input specifies or overrides the details of the adaptive stratified sampling technique. This input may include overriding parameters automatically determined by the system such as event frequency and margin of error.

Based on this input, the method includes calculating an adaptive sampling rate 302. This may be a different sampling rate for different strata or groups of events. As noted above, a stratum may be specified by any combination of application, audience, channel, platform, build or other segmentation of the userbase.

Next, a configuration based on the determined adaptive sampling rate is distributed 303 to relevant clients that are within the identified strata. The clients then generate telemetry based on this configuration and store 304 that telemetry for analysis as described above. With regard to the client generating the telemetry data, the client can be using any telemetry Application Program Interfaces (APIs) which log some information about the client applications operations/events. Telemetry Software Development Kits (SDKs) can be used to configure the application to report telemetry. As explained above in the flow, the client will look for the sample rate for an event from the mapping sent from the configurations and the user-input/system determined EF/MOE for an event. Once the client determines the sample rate of an event, the client, depending on the sampling logic in the client app (user based sampling, device based sampling), and knowing its location in the sample, determines if it belongs to the sample population which uploads this event or not. In some productivity applications, device identifiers may be hashed. In this case, the client checks if eventSampleRate>=deviceHash, then uploads the telemetry accordingly. The system/application in the client that generates telemetry can be any application that is running the telemetry SDK.

The configuration can be used to change the way the client generates telemetry as follows. An application with configuration, for example, of EU, Win32, Language1—will receive a different mapping table than an application with a configuration of EU, Win32, Language2. With different mapping tables, an event will have different sample rates determined by the client as described above. Thus, while the device is the same, an event may or may not be sampled depending on how the developer wants the metrics to be set. As the usage grows of the population with the configuration of EU, Win32, Language1, the system will update the mapping tables to reduce the sample rate such that a reduced volume of telemetry is generated but still providing enough telemetry from the increased population.

Figure 6B:
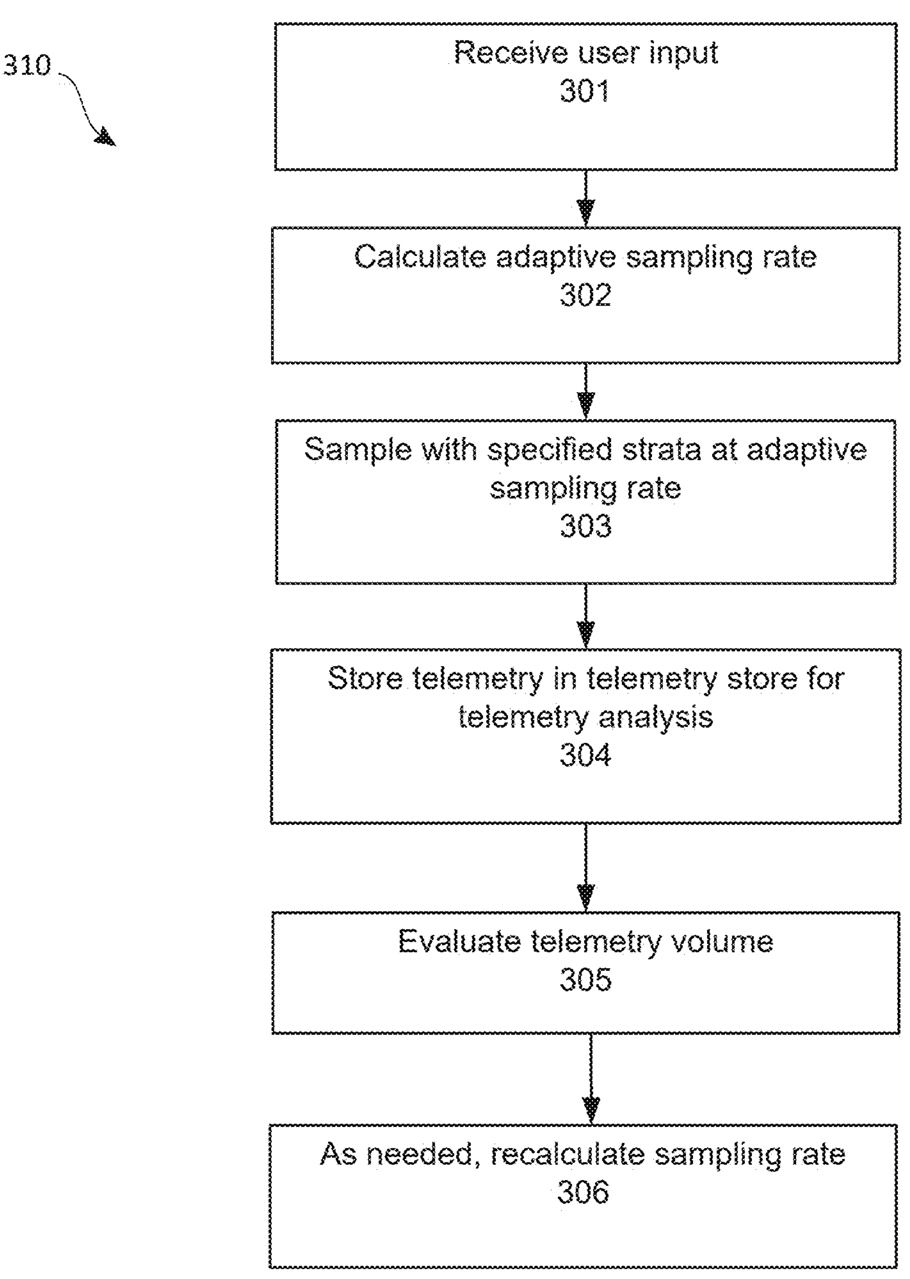

FIG. 6B depicts another flowchart for a method with additional details for collecting telemetry according to aspects of the present description. The method 310 of FIG. 6B is similar to that of FIG. 5 including receiving user input 301, calculating an adaptive sampling rate 302, sampling with a specified strata at that adaptive sampling rate 303 and storing the resulting telemetry in a telemetry store for analysis 304.

Additionally, FIG. 6B includes evaluating the telemetry volume 305 that is being generated under the current configuration for the telemetry store. This volume of telemetry may be non-optimal for a variety of reasons. There may still be an excess of telemetry being generated or there may be insufficient telemetry under the current configuration. Thus, as needed, the method concludes with the feedback loop of recalculating the sampling rate and adjusting the configuration based on the evaluation of telemetry volume 305.

Figure 7:
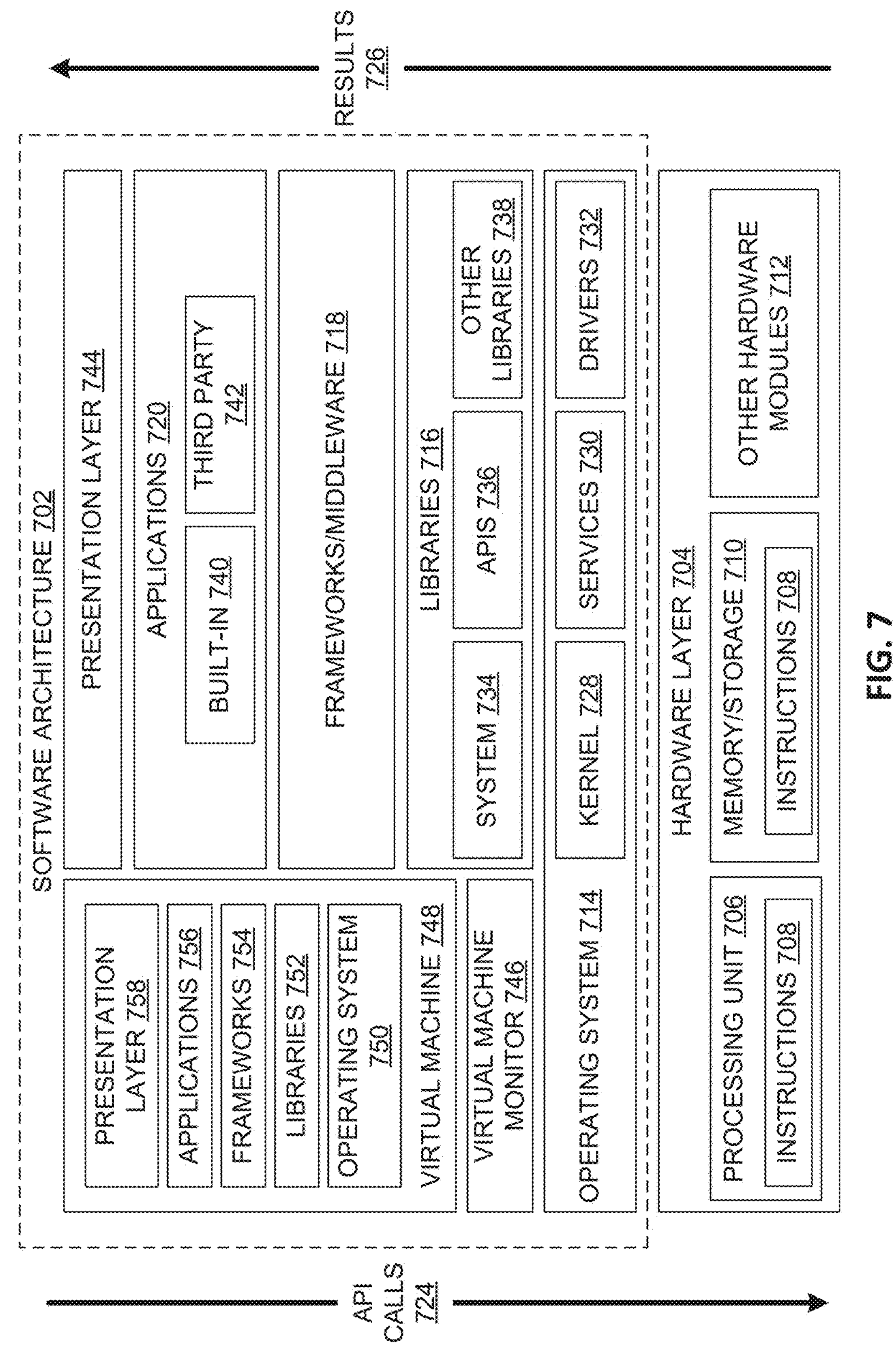
FIG. 7 is a block diagram illustrating an example software architecture, various portions of which may be used in conjunction with various hardware architectures herein described.

FIG. 7 is a block diagram 700 illustrating an example software architecture 702. This architecture may be used in each of the various services described above. Also, various portions of this architecture may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and Input/Output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
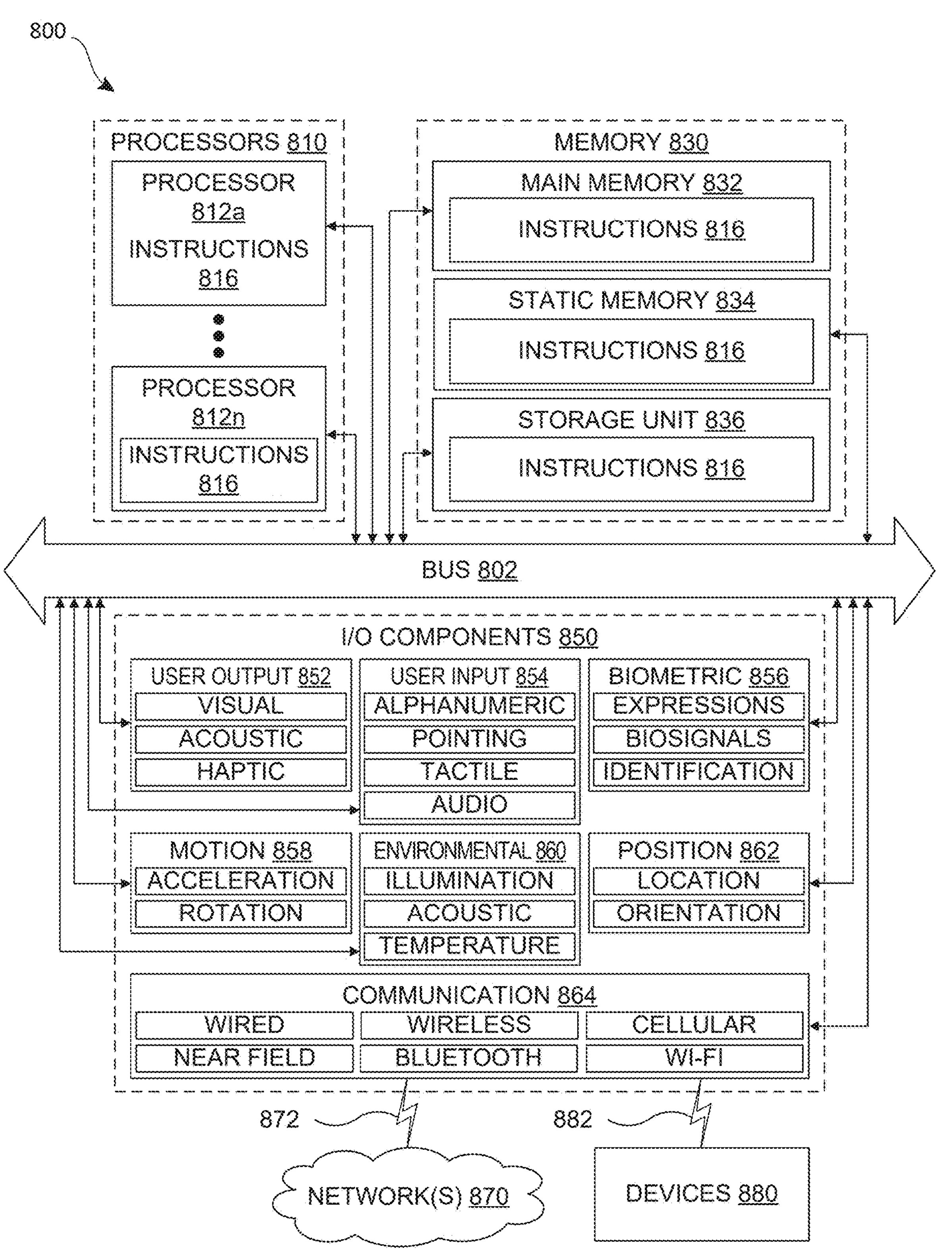
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. The machine 800 may be used to implement any of the services described in the system above.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP)

address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A system for optimizing telemetry volume generated for an application product, the system comprising:

a volume calculation service and a configuration service coupled to a client device via a network connection, the volume calculation service receiving identification of a particular event that occurs during execution of the application product by the client and calculating an optimized sampling rate for that event in telemetry produced by the client, the optimized sampling rate calculated based on reducing an overall volume of telemetry while still maintaining tracking of the particular event within the telemetry;

the configuration service generating a configuration for the client device, the configuration service configuring the client to use the optimized sampling rate to produce telemetry for the event during execution of the application product by the client device; and the configuration service configuring the client with the configuration to reduce an overall volume of telemetry that is produced by the client to reduce a load on resources used to produce, store and analyze the telemetry while still maintaining tracking of the particular event within the telemetry.

Item 2. The system of Item 1, wherein the configuration comprises: a value for event frequency and a value for margin of error and a mapping of event frequency and margin of error to sampling rate.

Item 3. The system of Item 2, wherein the configuration service provides the client with the values for event frequency and margin for error and the mapping, from which the client determines the optimized sampling rate.

Item 4. The system of Item 1, further comprising:

a telemetry store for receiving the telemetry produced by the client; and a telemetry volume service for observing a resulting telemetry volume produced by a current configuration and captured in the telemetry store.

Item 5. The system of Item 4, wherein the telemetry volume service is to provide input to the volume calculation service for updating the configuration.

Item 6. The system of Item 5, wherein telemetry volume service is to calculate a volume for each event and a total number of sessions for the mapping so as to provide input for updating the configuration.

Item 7. The system of Item 1, further comprising a user interface for receiving user input parameters, wherein the configuration is based on the user input.

Item 8. The system of Item 7, wherein the user input specifies a specific stratum within operation of the client for the configuration.

Item 9. The system of Item 8, wherein the stratum is defined by any of: application, audience, channel, platform and build.

Item 10. The system of Item 1, further comprising a telemetry analysis system for analyzing the telemetry to guide further development of the application product.

Item 11. A method of optimizing telemetry volume for an application product, the method comprising:

generating a configuration for a client running the application product, the configuration indicating a sampling rate for an event arising during execution of the application product by the client, the configuration and sampling rate indicating for the client when to selectively generate telemetry specifically for the event; and configuring the client with the configuration, the configuration reducing an overall amount of telemetry produced by the client while optimizing an amount of telemetry for the event that is produced by the client so as to reduce a load on resources used to produce, store and analyze the telemetry while still maintaining tracking of the event in the telemetry.

Item 12. The method of Item 11, wherein the configuration comprises: a value for event frequency and margin of error and a mapping of event frequency and margin of error to sampling rate.

Item 13. The method of Item 12, wherein the client fetches the values for event frequency and margin for error and the mapping from a configuration service and uses the values and mapping to determine the sampling rate.

Item 14. The method of Item 11, further comprising updating the configuration based on observation of the resulting telemetry volume produced by a current configuration in a telemetry store.

Item 15. The method of Item 14, wherein updating the configuration further comprises calculating a volume for each event and a total number of sessions for the mapping so as to provide input for updating the configuration.

Item 16. The method of Item 11, further comprising:
receiving user input through a user interface; and
generating the configuration according to the user input.

Item 17. The method of Item 16, wherein the user input specifies a specific stratum within operation of the client.

Item 18. The method of Item 17, wherein the stratum is defined by any of: application, audience, channel, platform and build.

Item 19. The method of Item 11, wherein the sampling rate is determined by using an established margin of error and confidence level to solve for an optimal size of a sampled population.

Item 20. A device comprising:
a processor,
a memory storing executable instructions which, when executed by the processor, cause the processor, alone or in combination with other processors, to perform the following functions:
determine a sampling rate that maps to an event frequency for an event; and
provide a telemetry configuration based on the sampling rate to client devices to limit a volume of reported telemetry data while maintaining reporting of the event within a determined margin of error.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for optimizing telemetry volume generated by a client device during an execution of an application product, the system comprising:
a processor; and
a memory storing executable instructions that, when executed, cause the processor alone or in combination with other processors to perform operations of:
receiving, by a volume calculation service, identification of an event that occurs during the execution of the application product by the client device, wherein the volume calculation service determines an event frequency (EF) and a margin of error (MOE) for the event based on an event volume, and generates a mapping table for the application product, the mapping table including a plurality of EFs and MOEs to be mapped to a plurality of sampling rates spanning a plurality of pivots;
generating, by a configuration service, a configuration for the client device that includes the EF, the MOE, and the mapping table;

fetching, by the client device, the configuration from the configuration service to obtain the EF, the MOE, and the mapping table; and determining, by the client device, an optimized sampling rate from the plurality of sampling rates that maps to the EF and the MOE for the event;

wherein the client device generates telemetry according to the optimized sampling rate in a manner that reduces the telemetry volume while maintaining tracking of the event within the telemetry.

2. The system of claim 1, further comprising:

a telemetry store for receiving the telemetry produced by the client device; and a telemetry volume service for observing a resulting telemetry volume produced by a current configuration and captured in the telemetry store.

3. The system of claim 2, wherein the telemetry volume service provides input to the volume calculation service for updating the configuration.

4. The system of claim 3, wherein the telemetry volume service calculates a volume for each event and a total number of sessions for the mapping table so as to provide the input for updating the configuration.

5. The system of claim 1, further comprising a user interface for receiving user input parameters, wherein the configuration is based on user input.

6. The system of claim 5, wherein the user input specifies a specific stratum within operation of the client device for the configuration.

7. The system of claim 6, wherein the specific stratum is defined by any of: application, audience, channel, platform and build.

8. The system of claim 1, further comprising a telemetry analysis system for analyzing the telemetry to guide further development of the application product.

9. A method of optimizing telemetry volume for an application product, the method comprising:

receiving, by a volume calculation service, identification of an event that occurs during execution of the application product by a client device, wherein the volume calculation service determines an event frequency (EF) and a margin of error (MOE) for the event based on an event volume, and generates a mapping table for the application product, the mapping table including a plurality of EFs and MOEs to be mapped to a plurality of sampling rates spanning a plurality of pivots;

generating, by a configuration service, a configuration for the client device that includes the EF, the MOE, and the mapping table;

fetching, by the client device, the configuration from the configuration service to obtain the EF, the MOE, and the mapping table; and determining, by the client device, an optimized sampling rate from the plurality of sampling rates that maps to the EF and the MOE for the event;

wherein the client device generates telemetry according to the optimized sampling rate in a manner that reduces the telemetry volume while maintaining tracking of the event within the telemetry.

10. The method of claim 9, further comprising updating the configuration based on observation of resulting telemetry volume produced by a current configuration in a telemetry store.

11. The method of claim 10, wherein updating the configuration further comprises calculating a volume for each event and a total number of sessions for the mapping table so as to provide input for updating the configuration.

12. The method of claim 9, further comprising:

receiving user input through a user interface; and generating the configuration according to the user input.

13. The method of claim 12, wherein the user input specifies a specific stratum within operation of the client device.

14. The method of claim 13, wherein the specific stratum is defined by any of: application, audience, channel, platform and build.

15. The method of claim 9, wherein the optimized sampling rate is determined by using an established margin of error and confidence level to solve for an optimal size of a sampled population.

16. A client device comprising:

a processor; and a memory storing executable instructions which, when executed by the processor, cause the processor, alone or in combination with other processors, to perform operations of:

receiving, by a volume calculation service, identification of an event that occurs during execution of an application product by the client device, wherein the volume calculation service determines an event frequency (EF) and a margin of error (MOE) for the event based on an event volume, and generates a mapping table for the application product, the mapping table including a plurality of EFs and MOEs to be mapped to a plurality of sampling rates spanning a plurality of pivots;

generating, by a configuration service, a configuration for the client device that includes the EF, the MOE, and the mapping table;

fetching, by the client device, the configuration from the configuration service to obtain the EF, the MOE, and the mapping table; and determining, by the client device, an optimized sampling rate from the plurality of sampling rates that maps to the EF and the MOE for the event;

wherein the client device generates telemetry according to the optimized sampling rate in a manner that reduces telemetry volume while maintaining tracking of the event within the telemetry.

* * * * *